United States Patent [19]

McAndrew

[11] 4,360,370
[45] Nov. 23, 1982

[54] POPPET VALVE FOR BAGHOUSE OUTLET PLENUM

[75] Inventor: Miles J. McAndrew, Norwalk, Conn.

[73] Assignee: General Electric Co., Lebanon, Pa.

[21] Appl. No.: 242,089

[22] Filed: Mar. 9, 1981

Related U.S. Application Data

[63] Continuation of Ser. No. 87,860, Oct. 24, 1979, abandoned.

[51] Int. Cl.³ .............................................. B01D 46/04
[52] U.S. Cl. ......................................... 55/302; 55/96; 55/417; 251/118; 137/625.38
[58] Field of Search ................... 55/96, 302, 303, 417; 137/625.38, 625.39, 625.33, 625.3; 251/121, 122, 205, 118

[56] References Cited

U.S. PATENT DOCUMENTS

| Re. 29,280 | 6/1977 | McNabey . | |
|---|---|---|---|
| 991,550 | 5/1911 | Thomas | 251/121 |
| 2,071,876 | 2/1937 | Gordon | 137/625.3 |
| 3,616,614 | 11/1971 | Elsenegger . | |
| 3,706,320 | 12/1972 | Kalsi . | |
| 3,834,662 | 9/1974 | Huntington | 251/121 |
| 3,898,062 | 8/1975 | Slakey . | |
| 3,975,173 | 8/1976 | Peterson et al. | 55/96 |
| 4,046,526 | 9/1977 | Phillipi | 55/96 |
| 4,113,449 | 9/1978 | Bundy | 55/302 |

Primary Examiner—Bernard Nozick
Attorney, Agent, or Firm—Philip L. Schlamp

[57] ABSTRACT

Following reverse gas flow cleaning of bag filters in a baghouse (17), controlled re-inflation of the bag filters is provided by a poppet valve (10) positioned in an opening (15) through which dust-free gas can pass from the baghouse (17) into a clean gas plenum (20). The poppet valve (10) comprises a valve plate (30) affixed to a valve stem (31) that is mounted for translational motion in the opening (15) so that the valve plate (30) can cover the opening (15) when the opening (15) is to be closed and can be moved away from the opening (15) when the opening (15) is to be unclosed. A cylindrical skirt (32) affixed to the valve stem (31) provides restricted gas flow through the opening (15) for a sufficient time to enable gradual re-inflation of the bag filters as the valve (10) is being opened following reverse gas flow cleaning of the bag filters. The cyllindrical skirt (32) has a longitudinally extending orifice portion such as at least one longitudinally extending slot (50) to enable the rate of dust-free gas flow through the opening (15) to be increased gradually as the valve (10) is being opened.

2 Claims, 2 Drawing Figures

POPPET VALVE FOR BAGHOUSE OUTLET PLENUM

This is a continuation of application Ser. No. 87,860, filed Oct. 24, 1979, now abandoned.

BACKGROUND OF THE INVENTION

1. Field of the Invention

The present invention pertains generally to baghouses for separating dust from gas streams.

More particularly, the present invention pertains to means for controlling the re-inflation of bag filters in a baghouse following reverse gas flow cleaning.

2. State of the Prior Art

Many kinds of dust produced in industrial processes can be separated from gas streams by fabric filters made of natural or synthetic fibers. A prevalent dust filtration technique utilizes a plurality of tubular bag-like fabric filters, referred to as bag filters, mounted in an enclosed structure called a baghouse. The bag filters are usually mounted vertically within the baghouse, and are open at their bottom ends. In a typical baghouse arrangement, streams of a dust-laden gas to be filtered are passed into the interiors of the bag filters through the open bottom ends. Dust from the gas streams is retained on the inside surfaces and in the interstices of the fabric of the bag filters, and dust-free gas is drawn through the fabric into the interior of the baghouse external to the bag filters. A pressure difference (maintained by conventional means) between the interior of the baghouse and a clean gas plenum causes dust-free gas to be drawn into the clean gas plenum for passage either to a region where the gas is to be used or further processed, or to a stack for release to the atmosphere.

The dust that collects on the inner surfaces of a bag filter forms a cake, referred to as the dust cake, which acts as a filter medium for removing other dust from the gas stream. However, the dust cake increases the impedence of the bag filter to the passage of gas therethrough. Consequently, the bag filters in a baghouse must be cleaned periodically to remove a major portion of the dust cake therefrom so that gas flow therethrough can be maintained at an acceptable rate.

A method for removing the dust cake from the inner surfaces of the bag filters in a baghouse involves periodically stopping the flow of dust-laden gas into the baghouse and closing an opening to the clean gas plenum, and then directing a flow of dust-free gas from the clean gas plenum back into the baghouse for passage through the bag filters in the opposite direction. This method is called reverse gas flow cleaning.

Dust-laden gas flow in the normal direction through the filter fabric (i.e., in the direction of dust cake formation) tends to press the dust cake against the fabric. Stopping the flow of dust-laden gas in the normal direction serves to release the dust cake from the fabric; and directing the burst of dust-free gas in the reverse direction through the fabric serves to push the dust cake away from the fabric. The dust cake thus removed from the bag filters falls into a hopper for collection and eventual removal from the baghouse. A discussion of particular baghouse designs, applications and filter cleaning techniques known to the prior art can be found in an article by Milton N. Kraus entitled "Baghouses: Separating and Collecting Industrial Dusts" published in *Chemical Engineering*, Apr. 9, 1979, pages 94–106.

During bag filter cleaning by the reverse gas flow method, the bag filters in a baghouse tend to collapse inward or deflate due to the greater pressure on the outside surfaces than on the inside surfaces of the bag filters. Upon re-establishment of dust-laden gas flow in the normal direction following completion of the reverse gas flow cleaning of the fabric, the bag filters are re-inflated to their normal configurations. Rapid and uncontrolled re-inflation of the bag filters, however, can have a deleterious effect on the filter fabric. Sudden resumption of the gas flow in the normal direction can tear the fabric, a phenomenon known as "bag popping".

Various valving techniques have been developed in the prior art for controlling gas flow in baghouse operations. Examples of such techniques are described in U.S. Pat. Nos. 3,057,137 to D. B. Perlis et al.; 3,396,516 to W. E. Ballard; 3,521,430 to H. D. Vanderlip et al.; 3,540,193 to J. Pausch; 3,898,062 to P. B. Slakey; 3,926,595 to O. K. Bockman; 3,945,400 to P. B. Slakey; and 3,963,467 to D. W. Rolschau. Until the present invention, however, a reliable and relatively inexpensive valving technique for precisely controlling the re-inflation rate of bag filters in a baghouse had not been known, which could readily take into account such variables as the dimensions and material of the bag filters, the nature and flow rate of the gas stream, the nature and concentration of the dust in the gas stream, and the rapidity of change of any of these variables.

OBJECTS OF THE INVENTION

It is an object of the present invention to provide a means for precisely controlling the re-inflation rate of bag filters in a baghouse following reverse gas flow cleaning.

In accordance with the present invention, a poppet valve is provided to enable precisely controllable dust-free gas flow from the interior of a baghouse into a clean gas plenum during re-establishment of dust-laden gas flow in the normal direction through bag filters in the baghouse following reverse gas flow cleaning of the bag filters. A poppet valve according to the present invention is disposed at an opening into the clean gas plenum from the interior of the baghouse. The poppet valve comprises a plate mounted on a stem for translational movement perpendicular to the opening, so that the opening can be sealingly closed when the valve plate covers the opening and opened when the valve plate is moved away from the opening.

Generally, several openings from the baghouse into the clean gas plenum are provided, with a valve according to the present invention being mounted at each opening, to enable precisely controllable dust-free gas flow from the baghouse into the clean gas plenum as dust-laden gas flow into the bag filters is re-established following reverse gas flow cleaning of the bag filters.

A feature of a poppet valve according to the present invention is a cylindrical skirt mounted on the valve stem to restrict the entry of dust-free gas through the opening into the clean gas plenum when the valve plate is initially raised away from the opening. The end of the cylindrical skirt adjacent the valve plate of each valve is covered, so that gas can pass from the interior of the baghouse into the clean gas plenum only via the clearance between the edge of each opening and the outer wall of the cylindrical skirt positioned in that opening. Each valve skirt is sufficiently long so that the valve skirt remains in its corresponding opening to restrict the flow of gas through the opening as the valve stem to which the skirt is attached rises, until the bag filters in the baghouse are re-inflated sufficiently to prevent "bag popping" or other damage to the filter fabric.

In a particular embodiment of the present invention, one or more longitudinally extending orifices are provided in the cylindrical wall of each valve skirt. Without such longitudinal orifices, the rate of gas flow from the baghouse through each opening into the clean gas plenum would depend only on the area of the annular clearance between the circumference of the opening and the outer wall of the valve skirt as long as the valve skirt is present in the opening. With such longitudinal orifices, however, the rate of gas flow through each opening into the clean gas plenum can be gradually increased as the valve skirt is raised. In this way, precise control of the rate of gas flow from the baghouse into the clean gas plenum can be achieved.

A poppet valve according to the present invention serves as a flow-restricting damper during re-inflation of the bag filters, yet does not restrict dust-free gas flow into the clean gas plenum after the bag filters have been re-inflated. Thus, with the present invention, a separate flow-restricting damper is not necessary to prevent abrupt pressure change in the baghouse during re-establishment of dust-laden gas flow in the normal direction after completion of reverse gas flow cleaning of the bag filters. With the need for a separate flow-restricting damper eliminated, the concomitant need for associated air cylinders, solenoids and limit switches is likewise eliminated, thereby providing a significant reduction in the overall cost of the baghouse installation.

DESCRIPTION OF THE PREFERRED EMBODIMENT

Figure 1:
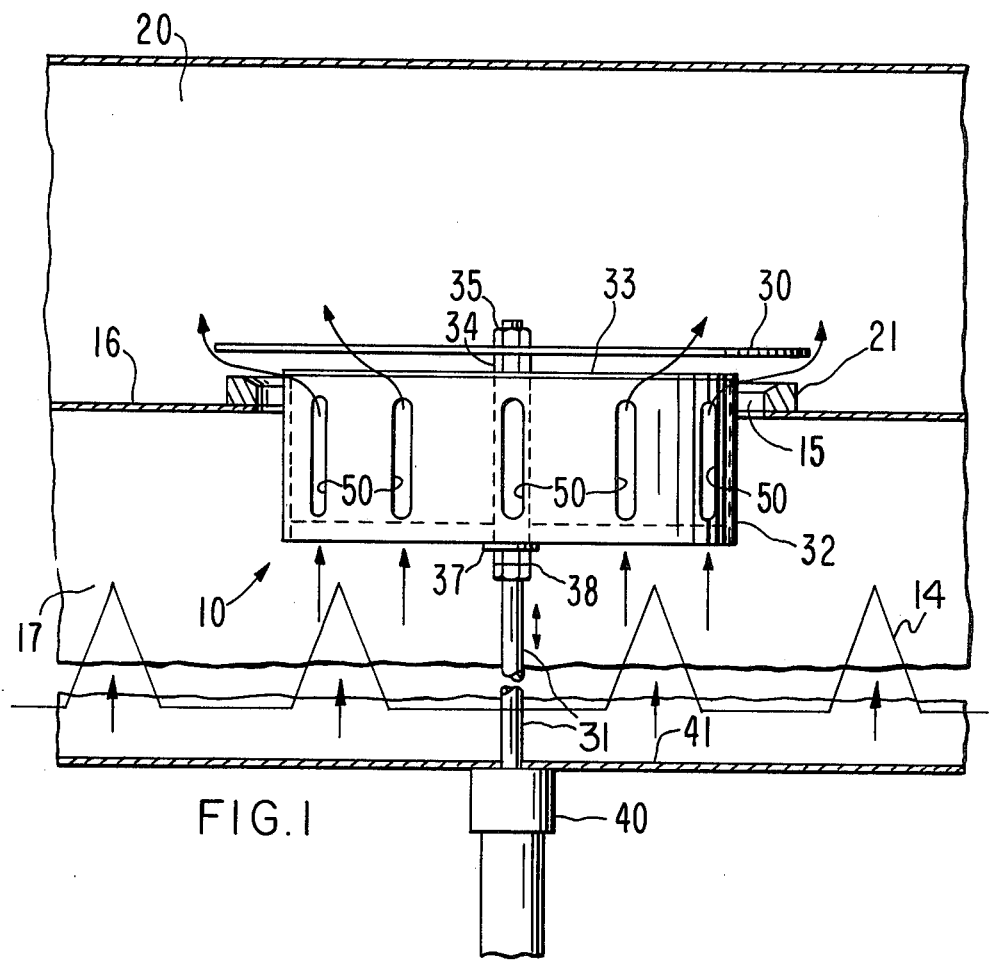
FIG. 1 is a side view of a poppet valve according to the present invention, shown in flow-restricting open condition.
Figure 2:
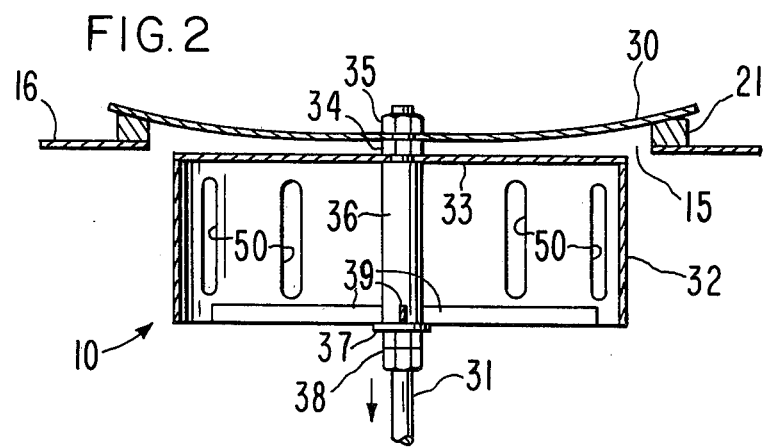
FIG. 2 is a cross-sectional side view of the poppet valve of FIG. 1, but shown in closed condition.

A poppet valve according to the present invention is indicated by the reference number 10 in FIGS. 1 and 2. The valve 10 is mounted in an opening 15 in a wall 16 of a baghouse 17. The opening 15 provides gas flow communication between the baghouse 17 and a clean gas plenum 20. When the valve 10 is open, dust-free gas from the baghouse 17 can be drawn through the opening 15 into the plenum 20 by a pressure difference maintained by conventional means (e.g., an exhaust fan) not shown in the drawing.

The opening 15 is preferably but not necessarily of circular configuration; and the edge of the opening 15 outside the baghouse 17 and within the plenum 20 is rimmed by a circular seating ridge 21. The valve 10 comprises a plate 30 mounted on a stem 31. The valve plate 30 is preferably circular, conforming to the configuration of but having a larger diameter than the opening 15 and the seating ridge 21.

The valve stem 31 is mounted by conventional means within the baghouse 17 to extend through the opening 15, so as to support the valve plate 30 in the interior of the plenum 20 over the opening 15. The valve stem 31 is generally perpendicular to the plane of the opening 15, and supports the valve plate 30 so as to overlap the seating ridge 21. As shown in FIGS. 1 and 2, the valve plate 30 has a central aperture through which the upper end of the valve stem 31 passes; and the valve plate 30 may be secured to the valve stem 31 by nuts 34 and 35, one on either side of the valve plate 30.

Affixed to the valve stem 31 as an integral part of the valve 10 is a cylindrically configured skirt 32. A cover member 33 closes the upper end of the skirt 32 adjacent the valve plate 30, while the lower end of the skirt 32 remote from the valve plate 30 is open. As shown in FIG. 2, the cover member 33 has a central aperture through which the valve stem 31 passes. The skirt 32 is positioned so that the cover member 33 is separated from the underside of the valve plate 30 by the nut 34. A cylindrical sleeve 36 fits over the valve stem 31 and is positioned to press against the underside of the cover member 33 so as to hold the cover member 33 against the nut 34. The sleeve 36 is held in position on the valve stem 31 by a washer 37 and one or more lock nuts 38. A plurality of symmetrically arranged elongate strut members 39 affixed to the sleeve 36 as by welding extend radially outward to the cylindrical wall of the skirt 32 to reinforce the skirt 32. The strut members 39 are preferably welded to the interior of the skirt 32, and prevent wobbling of the skirt 32.

The valve stem 31, and hence also the attached valve plate 30 and the cylindrical skirt 32, are translatable in the vertical direction (i.e., up and down) by means of a conventional poppet valve actuating mechanism 40, so that the opening 15 can be opened or closed depending upon whether the valve plate 30 is positioned away from or in contact with the seating ridge 21. As shown in FIG. 1, the valve actuating mechanism 40 may advantageously be located outside the baghouse 17, in which case the valve stem 31 extends outside the baghouse 17 to the valve actuating mechanism 40 through an aperture in bottom wall 41 of the baghouse 17.

In a baghouse installation where poppet valves according to the present invention are utilized, bag filters 14 are mounted by conventional means in the interior of the baghouse 17. Typically, a stream of dust-laden gas is directed into the interior of each bag filter, whereupon dust is removed from the gas stream and deposited as a cake on the inner surface of the bag filter. Dust-free gas then passes through the fabric of each bag filter into the interior of the baghouse 17. The dust-free gas is thereupon drawn through opening 15 (or more typically through a plurality of such openings) into the clean gas plenum 20. The present invention, however, is not dependent upon the direction of gas flow through the bag filters during the filtering mode, and could be utilized in a baghouse installation wherein dust-laden gas flow during the filtering mode proceeds in a direction from the exterior into the interior of the bag filters so that the dust cake forms on the exterior surfaces of the bag filters. Regardless of whether the dust cake forms on the interior or on the exterior surfaces of the bag filters in any particular baghouse installation, a poppet valve according to the present invention provides a reliable and relatively inexpensive means for facilitating the cleaning of the bag filters in the baghouse by the reverse gas flow method.

Dust-laden gas flow in the normal direction must be stopped and the valve 10 must be closed before reverse flow of dust-free gas through bag filters 14 in the baghouse 17 can be initiated. As indicated in FIG. 2, the force applied by the valve actuating mechanism 40 in moving the valve plate 30 into contact with the seating ridge 21 may advantageously be large enough to cause deflection of the valve plate 30 in order to insure a gas-tight seal between the valve plate 30 and the seating ridge 21.

Reverse gas flow serves to loosen the dust cake from the surfaces of the bag filters 14, whereupon the dust cake material can fall into appropriately disposed hoppers of conventional design (not shown) for collection and eventual removal from the baghouse 17. Reverse flow of dust-free gas through the bag filters tends to collapse the bag filters inward (i.e., to deflate the bag filters). Upon re-establishment of dust-laden gas flow in the normal direction, however, the bag filters re-inflate to their normal configurations. If re-inflation of the bag filters were to occur too abruptly, the filter fabric might become weakened, unevenly stretched, or torn. It is therefore important to provide for gradual re-establishment of the normal pressure difference between the baghouse 17 and the clean gas plenum 20, following completion of reverse gas flow cleaning of the filter bags 14 in the baghouse 17.

After the reverse gas flow cleaning operation has been completed, dust-free gas flow in the reverse direction through the bag filters is stopped and dust-laden gas flow in the normal direction is re-established. To re-establish gas flow in the normal direction, the poppet valve 10 is opened (i.e., the valve stem 31 is raised) by the valve actuating mechanism 40 at a controlled rate that is determined on the basis of such variables as the dimensions and material of the bag filters, the nature and flow rate of the dust-laden gas stream into the bag filters 14, the nature and concentration of the dust carried by the gas stream, and the rate at which any of these variables changes or is likely to change.

As the valve stem 31 is raised, the cylindrical skirt 32 remains in the opening 15 until the bottom end of skirt 32 is lifted fully into the clean gas plenum 20. The cylindrical skirt 32 is long enough in the axial dimension to enable restricted gas flow through the opening 15 to be maintained until the bag filters 14 in the baghouse 17 have gradually re-inflated to a sufficient extent so that "bag popping" or other adverse consequences to filter fabric can be prevented. The axial length of the cylindrical skirt 32 is selected as appropriate for the variables that significantly affect bag filter 14 longevity at the particular baghouse installation.

Longitudinally extending slots 50 are provided on the wall of the cylindrical skirt 32 to enable fine control of the rate of gas flow through the opening 15 into the clean gas plenum 20. Alternatively, a longitudinally extending array of holes could be used in place of each longitudinally extending slot 50. Without at least one such longitudinally extending orifice portion of the skirt 32, the rate of gas flow through the opening 15 would depend only upon the area of the annular clearance between the circumference of the opening 15 and the cylindrical wall of the skirt 32, and would not be affected by the rate at which the valve stem 31 is raised as long as the skirt 32 is still within the opening 15. With the slots 50, however, the rate of gas flow through the opening 15 can be gradually increased in a continuous manner by raising the valve stem 31. The portion of each slot 50 extending above the baghouse wall 16 increases as the valve stem 31 is raised, thereby enabling the rate of gas flow through the opening 15 into the clean gas plenum 20 to be precisely controlled by adjusting the rate at which the valve stem 31 is raised.

After the bag filters 14 in the baghouse 17 have re-inflated to their normal configurations, the valve stem 31 is further raised to where the cylindrical skirt 32 is positioned above the opening 15 to enable unrestricted gas flow from the baghouse 17 into the clean gas plenum 20. Filtration of dust from the dust-laden gas stream passing through the fabric of the bag filters 14 then continues until the next time that reverse gas flow cleaning of the bag filters 14 is scheduled to occur, whereupon the poppet valve 10 is again closed and reverse gas flow cleaning is repeated.

The present invention has been described above in terms of a particular embodiment, which is not to be construed in limitation of the invention but rather as a disclosure of the best mode presently contemplated by the inventor of carrying out his invention. The scope of the invention is defined by the following claims and their equivalents.

What is claimed is:

1. An apparatus for removing dust from a dust-laden gas stream, said apparatus comprising a baghouse in which at least one bag filter is mounted, means for directing said dust-laden gas stream in a first direction with respect to said bag filter so that dust can be removed from said gas stream and form a cake on said bag filter leaving dust-free gas to pass through said bag filter into said baghouse, a wall of said baghouse being apertured to provide an opening through which said dust-free gas can be drawn from said baghouse into a clean gas plenum, means for periodically stopping flow of said dust-laden gas stream in said first direction and for directing a stream of dust-free gas from said clean gas plenum in a second direction with respect to said bag filter, said second direction being opposite to said first direction, means for closing said opening when said dust-free gas stream is being directed in said second direction and for opening said opening after flow of said dust-free gas stream in said second direction has stopped following removal of said dust cake from said bag filter, said means for closing and opening said opening comprising a poppet valve, said poppet valve including a valve plate affixed to a valve stem, said valve stem being translatable so that said valve plate can be moved to a position covering said opening when said opening is to be closed and to a position away from said opening when said opening is to be opened, with a gas flow restricting means being affixed to said valve stem, said gas flow restricting means thereby being positionable in said opening as said valve stem is being translated to open said opening until said bag filter has been re-inflated following removal of said dust cake from said bag filter, said gas flow restricting means being elongate along an axis through said opening and configured so that as said bag filter is being re-inflated and as said closure member is moved away from said opening, the gas flow rate is gradually increased while said gas flow restricting means is positioned in said opening, said opening having a circular edge, said gas flow restricting means comprises a skirt having a generally cylindrical wall coaxially surrounding and spaced apart from said valve stem, said opening having a circular edge, said cylindrical wall having a diameter that is smaller than the opening to form an annular clearance therebetween that permits restricted air flow therethrough, an end of said skirt removed from said valve plate being uncovered, and wherein said cylindrical wall of said skirt includes at least one longitudinally extending orifice adapted to permit an increasing reinflation air flow while the skirt is still within the opening but being moved through the opening.

2. The apparatus of claim 1 wherein said longitudinally extending orifice portion of said cylindrical wall comprises at least one longitudinally extending slot.

* * * * *